United States Patent
Marchthaler et al.

(10) Patent No.: US 6,859,707 B2
(45) Date of Patent: Feb. 22, 2005

(54) DEVICE FOR CLASSIFYING PERSONS OR OBJECTS

(75) Inventors: Reiner Marchthaler, Gingen (DE); Thomas Lich, Schwaikheim (DE); Frank Mack, Stuttgart (DE); Michael Meyer, Altdorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/343,468
(22) PCT Filed: May 29, 2002
(86) PCT No.: PCT/DE02/01971
§ 371 (c)(1), (2), (4) Date: Jul. 8, 2003
(87) PCT Pub. No.: WO02/096720
PCT Pub. Date: Dec. 5, 2002

(65) Prior Publication Data
US 2004/0032115 A1 Feb. 19, 2004

(30) Foreign Application Priority Data
May 21, 2001 (DE) .......................... 101 26 452

(51) Int. Cl.$^7$ ............................ G06F 7/00; G06F 17/00
(52) U.S. Cl. .................... 701/45; 280/734; 280/735; 340/667; 340/438
(58) Field of Search ................. 701/45, 1, 36; 280/734, 738, 730.1, 748; 340/500, 666, 667, 438

(56) References Cited

U.S. PATENT DOCUMENTS

| 5,624,132 A | * | 4/1997 | Blackburn et al. | 280/735 |
| 6,341,252 B1 | * | 1/2002 | Foo et al. | 701/45 |
| 6,442,504 B1 | * | 8/2002 | Breed et al. | 702/173 |
| 2003/0109993 A1 | * | 6/2003 | Peat et al. | 702/56 |
| 2003/0209893 A1 | * | 11/2003 | Breed et al. | 280/735 |

FOREIGN PATENT DOCUMENTS

| DE | 42 12 018 | 10/1992 |
| DE | 195 46 297 | 6/1997 |
| DE | 199 08 165 | 8/2000 |
| DE | 199 32 520 | 2/2001 |
| WO | WO 99 38731 | 8/1999 |
| WO | WO 01 18506 | 3/2001 |
| WO | WO 01 85497 | 11/2001 |

* cited by examiner

Primary Examiner—Thomas G. Black
Assistant Examiner—Olga Hernandez
(74) Attorney, Agent, or Firm—Kenyon & Kenyon

(57) ABSTRACT

A device for classifying persons or objects, in particular for occupant classification in a motor vehicle, includes an arrangement for acquiring characteristic data on the person to be classified or the object to the classified; at least one algorithm for extracting features from the instantaneously acquired characteristic data; at least one filter for determining the classification of the person or the object from the instantaneously extracted features, taking into account the time progression of the features extracted for the person to be classified or the object to be classified; and a first counter for initiating the resetting of the filter when the algorithm, during the first time interval specified by the first counter, has exclusively provided features for the non-presence of a person or an object, so that the resetting behavior of the algorithm, or the filter downstream from the algorithm, may be decoupled from the output of the determined classification in a simple manner. A holding member is connected downstream from the filter to forward the classification determined by the filter, and a second counter is provided to initiate the resetting of the holding member if the algorithm, even after the second time interval specified by the second counter has elapsed, has provided only features for the non-presence of a person or an object.

7 Claims, 1 Drawing Sheet

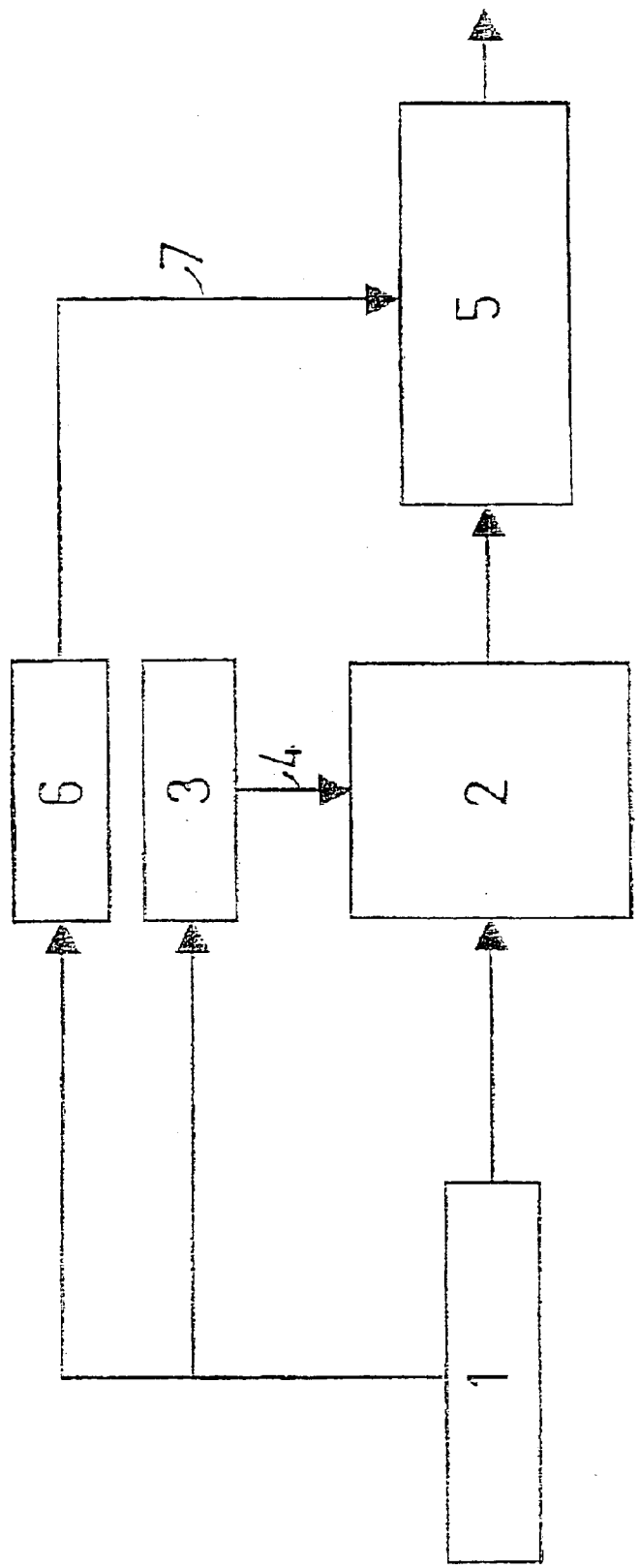
Fig.

DEVICE FOR CLASSIFYING PERSONS OR OBJECTS

FIELD OF THE INVENTION

The present invention relates to a device for classifying persons or objects, such as for occupant classification in a motor vehicle.

BACKGROUND INFORMATION

The triggering of a restraint arrangement in a motor vehicle may occur as a function of a variety of parameters, such as the seriousness of the collision and the position and the weight of the passengers. For that reason, not only the seat occupancy, but characteristic data for each individual occupant may be detected as well, which allows conclusions as to the weight of the occupant, so that each occupant may be assigned a weight classification. In practice, force sensors, which are installed in the individual seats, may be used to detect the characteristic data for such an occupant classification. The force sensors may be foil strain gauges for the direct measurement of weight. However, the force-sensor system may also be implemented in the form of a sensor mat having pressure-sensitive sensor cells, which are arranged in a matrix and may be activated individually, to detect the pressure distribution in the seat in the form of a value matrix. The heavier a person, the greater the depression of the seat material and the higher the number of activated sensor cells. Moreover, the pressure value per se detected by a sensor cell may be dependent on the respective pressurization. In the evaluation of the pressure data acquired by the individual sensor cells of the sensor mat, the number of the activated sensor cells may, therefore, be taken into account as well, in addition to the individual pressure values. A control device, which is likewise installed in the seat, may perform the evaluation. The result of the evaluation, namely the determined respective weight classification, may be forwarded to the air bag control device, so that in the triggering of the restraint arrangement the individual seat occupancy may be taken into account. This exemplary method may be largely independent of external conditions, such as cold or wear.

In conventional devices for passenger classification, features may be extracted from the continually detected pressure data with the aid of an appropriate algorithm, from which a filter, connected downstream from the algorithm, may then determine the weight classification. The filter parameters may be continually updated and selected such that the time progression of the earlier acquired and evaluated pressure data is also taken into account. The weight classification of an occupant is newly determined approximately every 0.7 s on the basis of the then current pressure data. If the algorithm recognizes that a seat is unoccupied for more than 5 s, the filter parameters are reset. This reset is initiated by a simple counter, which specifies the time interval of approx. 5 s.

In the conventional device, the information "seat not occupied" is transmitted to the air bag control device with the resetting of the filter. As soon as the air bag control device receives the information "seat not occupied", the restraint arrangement for the respective seat is switched off, so that it is not triggered in a then occurring crash. This may often be problematic in practice, such as, for example, when a passenger briefly, but for longer than 5 s, gets up from his seat without exiting, for instance, to remove a coat while driving. In such a case, the air bag control device is supplied with the information "seat not occupied", the restraint arrangement is switched off, and the respective occupant may be unprotected, or insufficiently protected, until the air bag control device is once again provided with a realistic estimated value for the weight classification of the occupant.

German Published Patent Application No. 199 32 520 describes a device for classifying persons or objects, which includes an arrangement for acquiring characteristic data on the person to be classified or the object to be classified, at least one algorithm extracting features from the instantaneously acquired characteristic data; at least one filter determining the classification of the person or object from the instantaneously extracted features, taking into account the time progression of the features extracted for the person to be classified or the object to be classified; and a first counter via which the resetting of the filter is initiated if the algorithm, during the first time interval specified by the first counter, has provided exclusively features for the non-presence of a person or an object.

German Published Patent Application No. 199 08 165 discusses an arrangement for acquiring characteristic data on the person to be classified or the object to be classified, the arrangement including video sensing, ultrasound sensing or radar sensing.

German Published Patent Application No. 195 46 297 discusses the sensing of the occupant position for determining the occupant size.

German Published Patent Application No. 42 12 018 discusses the classification of persons and objects in the motor vehicle, the person or the object being classified with respect to its weight.

SUMMARY OF THE INVENTION

An exemplary device according to the present invention may include an arrangement for acquiring characteristic data on the person to be classified or the object to be classified; at least one algorithm extracting features from the instantaneously acquired characteristic data; at least one filter determining the classification of the person or object from the instantaneously extracted features, the time progression of the extracted features for the person or object to be classified being taken into account; and a first counter, via which the resetting of the filter may be initiated when the algorithm has provided exclusively features for the non-existence of a person or an object during the first time interval specified by the first counter.

An exemplary method according to the present invention may be used wherever persons or objects are to be classified in some form or another. The classification may be implemented on the basis of widely varying criteria, such as size or weight of the person or object. Data of all kinds may be acquired as characteristic data as long as they allow conclusions with respect to the classification criteria. If, for example, a size classification is to be implemented, characteristic data on the person to be classified or the object to the classified may be acquired by video sensing, ultrasound sensing or even radar sensing.

An exemplary device according to the present invention is explained in greater detail in the following, by way of example, on the basis of a weight classification of vehicle occupants.

The present invention may provide a device of the type mentioned in the introduction, by which the reset behavior of the algorithm, or the filter connected downstream from the algorithm, may be decoupled from the outputting of the determined classification in a simple manner.

According to an exemplary embodiment of the present invention, this may be achieved by connecting, downstream from the filter, a holding member for the classification determined by the filter, and by providing a second counter via which the resetting of the holding member is initiated if the algorithm, even after the second time interval specified by the second counter has elapsed, only supplies features for the non-presence of a person or an object.

According to an exemplary embodiment of the present invention, the output of the determined classification may be performed via the holding member connected downstream from the filter. The holding function of the holding member is only relevant when the algorithm or the filter is reset because the non-presence of a person or an object has been detected. In this case, the holding member continues to call up the most recently determined classification, until the holding member is reset as well or the algorithm once again provides features for a person or an object.

In an occupant classification that is to be taken into account in the triggering restraint arrangement in a motor vehicle, the afore-described holding member may be used to account for the case that a passenger rises from his seat for only a brief time, without leaving the vehicle. Even if the filter is reset in such a case because the algorithm detects the non-occupancy of the respective seat, the last determined weight classification of the passenger may continue to be supplied to the air bag control. Only when a passenger change is assumed, due to the duration of the non-occupancy, may the holding member be reset as well, so that only then the information "seat not occupied" is supplied to the air bag control device.

An exemplary second counter provided according to the present invention, which initiates the resetting of the holding member, may be parameterized independently of the first counter, which initiates the resetting of the filter. In an exemplary embodiment of the device for occupant classification in a motor vehicle according to the present invention, the first counter initiates the resetting of the filter parameters if the algorithm has provided only features for the non-presence of a person or an object for at least 3 s. This may ensure the reliable detection of a passenger change and the restarting of the classification. The second counter should only initiate the resetting of the holding member when the algorithm, for at least 20 s, has only provided features for the non-presence of a person or an object. Only then is it possible to reliably exclude that the respective occupant has risen from his seat only briefly, without changing the seat or leaving the vehicle.

BRIEF DESCRIPTION OF THE DRAWING

The FIGURE shows a exemplary representation of a device for occupant classification in a motor vehicle according to the present invention.

DETAILED DESCRIPTION

With the aid of the exemplary device shown in the FIGURE, occupants of a motor vehicle may be classified with respect to their weight. The individually determined weight classification is forwarded to an air bag control device, so that this information may be taken into account in the triggering of the restraint arrangement.

The exemplary device includes a pressure-sensor system in the form of a sensor mat, installed in the respective seat, to continually detect the pressure distribution in the seat. The detected pressure distribution is supplied to an algorithm 1 of the device, which extracts features from the detected pressure distribution from which conclusions may be drawn as to the weight classification of the respective occupant. A filter 2 is connected downstream from algorithm 1, implementing a time averaging of the features extracted via the most recent pressure distribution, provided no passenger change has occurred. The filter parameters of filter 2, thus, are determined by the history of the extracted features.

When algorithm 1 provides the information "seat not occupied" for the first time, a first counter 3 is activated. This counter 3 sends a reset signal 4 to filter 2 and in this manner initiates the resetting of the filter parameters if algorithm 1 has provided exclusively the information "seat not occupied" during the time interval specified by counter 3—in this case, for 5 s.

According to an exemplary embodiment of the present invention, the weight classification determined from the detected pressure distribution with the aid of algorithm 1 and filter 2 is forwarded to the air bag control device via a holding member 5 connected downstream from filter 2. Holding member 5 continues to forward the most recently determined weight classification to the air bag control unit even if algorithm 1 has already provided the information "seat not occupied" and filter 2 is reset. A second counter 6 is provided for resetting holding member 5, which is likewise activated when algorithm 1 supplies the information "seat not occupied" for the first time. By transmitting a corresponding reset signal 7, counter 6 initiates the resetting of holding member 5 only if algorithm 1 has exclusively provided the information "seat not occupied " during the time interval—20 s in this—specified by second counter 6. Only then may it be reliably assumed that a change in the seat occupation has occurred.

According to an exemplary embodiment of the present invention, first counter 3 and second counter 6 may be parameterized independently of one another. First counter 3 provides for a resetting of algorithm 1 or filter 2 when the respective seat is occupied, whereas second counter 6 continues to transmit to the air bag control device the most recently detected weight classification. The decoupling of algorithm 1 or filter 2 from the output may ensure that algorithm 1 immediately resumes operation and implements a new classification once the seat is newly occupied. However, in the event that the seat is unoccupied for only a brief time, second counter 6 ensures that the occupant is nevertheless taken into account in the triggering of the restraint arrangement, since the weight classification determined for him continues to be forwarded to the air bag control device.

What is claimed is:

1. A device for classifying persons and objects, comprising:

a first arrangement for acquiring characteristic data on one of a person and an object to be classified;

a second arrangement for executing at least one algorithm for extracting features from instantaneously acquired characteristic data;

at least one filter for determining a classification of one of the person and the object from instantaneously extracted features, wherein the at least one filter takes into account progression of previously extracted features over time for the one of the person and the object to be classified; and a first counter for initiating a resetting of the at least one filter when, during a first time interval specified by the first counter, the at least one algorithm has exclusively supplied features for an absence of the one of the person and the object;

a holding member arranged downstream from the at least one filter for outputting the classification determined by the at least one filter; and a second counter for initiating a resetting of the holding member if the at least one algorithm only supplies features for the absence of the one of the person and the object, even after a second time interval specified by the second counter has elapsed.

2. The device according to claim 1, wherein the device is used for occupant classification in a motor vehicle.

3. The device according to claim 1, wherein the first arrangement includes an arrangement for one of video sensing, ultrasound sensing, and radar sensing.

4. The device according to claim 1, wherein the first arrangement includes one of foil strain gauges for determining an absolute weight and a pressure-sensor system for determining a pressure distribution in a contact surface.

5. The device according to claim 4, wherein one of the person and the object is classified based on weight.

6. The device according to claim 1, wherein the first counter is configured to initiate the resetting of the at least one filter if the at least one algorithm, for at least 3 seconds, has exclusively provided features for the absence of the one of the person and the object.

7. The device according to claim 1, wherein the second counter is configured to initiate the resetting of the holding member if the at least one algorithm, for at least 20 seconds, has exclusively provided features for the absence of the one of the person and the object.

* * * * *